E. U. FOWLER.
TREE STAY.
APPLICATION FILED FEB. 7, 1921.
1,407,139. Patented Feb. 21, 1922.
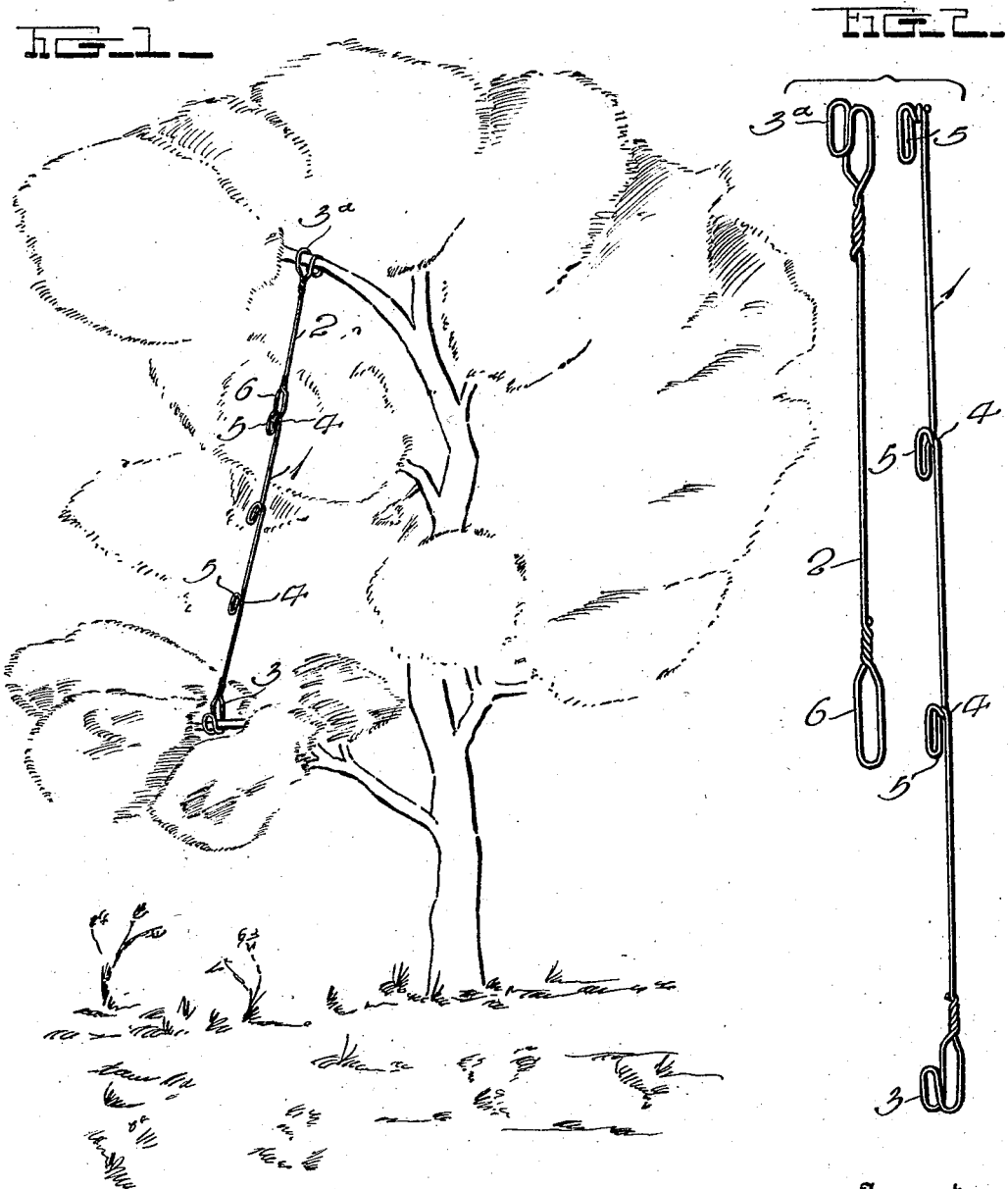
Inventor
ERNEST U. FOWLER

UNITED STATES PATENT OFFICE.

ERNEST URIAH FOWLER, OF TUSTIN, CALIFORNIA.

TREE STAY.

1,407,139.

Specification of Letters Patent.

Patented Feb. 21, 1922.

Application filed February 7, 1921. Serial No. 443,177.

*To all whom it may concern:*

Be it known that I, ERNEST URIAH FOWLER, a citizen of Dominion of Canada, residing at Tustin, in the county of Orange and State of California, have invented certain new and useful Improvements in Tree Stays; and I do declare the following to be a full, clear, and exact description of the invention, such as will enable others skilled in the art to which it appertains to make and use the same.

This invention relates broadly to that class of devices known as tree stays, having more specific relation to a device which may better be termed a limb support, the same being especially, although not necessarily, designed for use in supporting the limbs of fruit trees, and the main object of the invention being to entirely dispense with the ordinary types of props which usually consist of poles which engage the ground and obstruct, to a great extent, free passage underneath the lower limbs of the tree.

Another object of the invention is to generally improve upon devices of this class by the provision of one of extreme simplicity and durability, the same comprising a pair of adjustably connected rods or like elements having means at their opposite ends for engagement with the limbs of a tree, the adjustability of the device permitting the overladen limbs to be elevated to their original positions and prevented from drooping and separating from the trunk of the tree as oftentimes occurs.

A further object of the invention is to provide a device of this class which can be easily placed in position on the desired limbs, a plurality of such devices being used without interfering with easy gathering of the fruit.

Other objects and advantages of the invention will be apparent during the course of the following description.

In the drawing:

Figure 1 is an elevational view of a tree showing the manner of using my improved limb supporter.

Figure 2 is an enlarged elevational view of the parts of the device disconnected.

In carrying out the invention, I make use of a pair of fairly resilient rods 1 and 2, the first named rod being comparatively long for a purpose to be hereinafter set forth. Both of said rods are provided at one of their ends with hooks 3 and $3^a$ which, as is obvious, are designed to engage the limbs, these hooks being formed by bending one end of each rod in the manner disclosed. In addition to being equipped with a hook, the rod 1 is bent between its ends as indicated at 4 to provide a plurality of closely spaced similar hooks 5 and the rod 2 is bent at its opposite end to form an elongated eye or loop 6.

The device may be used as follows: The hook $3^a$ is secured to the limb preferably at a point near the trunk of the tree so as to insure against breakage of this limb. On the other hand, hook 3 of the rod 1 is engaged with the limb to be supported and this limb is raised to the desired elevation and one of the hooks 5 is engaged with the eye 6 of the rod 2, connecting the two rods together and retaining the overloaded limb in the position to which it has been raised. Hence, it will be seen that by equipping the rod 1 with a plurality of closely spaced hooks 5, the overloaded limb may be raised to various elevations and held in such positions. Also because of this particular construction, the device may be effectively used to connect limbs together which are far apart or close together as the case may be.

While I have shown and described the rods forming the device as being made from heavy wire bent to form the various hooks and connecting means, I wish it to be understood that this construction and arrangement is not limiting and may be slightly varied within the scope of the claims.

I claim:

1. A tree stay including a rod having a limb engaging hook at its outer end and an eye at its opposite end, and a second rod having a limb engaging hook and a plurality of closely spaced members adapted to engage said eye for adjustably connecting the two rods together.

2. A tree limb supporter comprising a resilient rod bent at one end to form a limb engaging hook and bent intermediate its ends and at its opposite end to provide a plurality of closely spaced hooks, and a second rod bent at one end to provide a limb-hook and at its opposite end to form an eye with which the last named hooks on the first named rod are engageable.

3. A tree limb supporting device including a rod bent at one end to form a hook for engagement with one of the limbs of the tree, said rod being bent intermediate its ends and at its opposite end to form a plurality of comparatively closely spaced hooks, the last named hooks being adapted for engagement with another rod to be connected with one of the other limbs of the tree.

In testimony whereof I have hereunto set my hand.

ERNEST URIAH FOWLER.